United States Patent
Luff et al.

(10) Patent No.: US 11,796,651 B2
(45) Date of Patent: Oct. 24, 2023

(54) WAVELENGTH SELECTION IN LIDAR SYSTEMS

(71) Applicant: SiLC Technologies, Inc., Monrovia, CA (US)

(72) Inventors: Bradley Jonathan Luff, La Canada Flintridge, CA (US); Dazeng Feng, El Monte, CA (US); Mehdi Asghari, La Canada Flintridge, CA (US); Majid Boloorian, San Diego, CA (US)

(73) Assignee: SiLC Technologies, Inc., Monrovia, CA (US)

( * ) Notice: Subject to any disclaimer, the term of this patent is extended or adjusted under 35 U.S.C. 154(b) by 783 days.

(21) Appl. No.: 16/875,985

(22) Filed: May 15, 2020

(65) Prior Publication Data

US 2020/0363515 A1    Nov. 19, 2020

Related U.S. Application Data

(60) Provisional application No. 62/849,747, filed on May 17, 2019.

(51) Int. Cl.
*G01C 3/08*    (2006.01)
*G01S 7/4911*    (2020.01)
(Continued)

(52) U.S. Cl.
CPC ............... *G01S 7/4911* (2013.01); *G01S 7/34* (2013.01); *G01S 7/4815* (2013.01)

(58) Field of Classification Search
None
See application file for complete search history.

(56) References Cited

U.S. PATENT DOCUMENTS

| 6,040,898 A | 3/2000 | Mrosik et al. |
| 9,157,790 B2 | 10/2015 | Shpunt et al. |

(Continued)

FOREIGN PATENT DOCUMENTS

| CN | 105589074 A | * | 5/2016 | ............. G01S 17/36 |
| DE | 10 2015 222061 A1 | | 5/2017 | |
| KR | 101 931 022 B1 | | 12/2018 | |

OTHER PUBLICATIONS

Anderson et al., "Iadar: Frequency-Modulated Continuous Wave Laser Detection AND Ranging", Photogrammetric Engineering & Remote Sensing, vol. 83, No. 11, Nov. 2017.

(Continued)

*Primary Examiner* — Mark Hellner
(74) *Attorney, Agent, or Firm* — Gavrilovich, Dodd & Lindsey LLP

(57) ABSTRACT

A Frequency Modulated Continuous Wave (FMCW) LIDAR system has a LIDAR chip configured to output a LIDAR output signal with a wavelength between 1290 nm and 1310 nm. The LIDAR chip is also configured to receive a LIDAR input signal from off of the LIDAR chip. The LIDAR input signal including light from the LIDAR output signal after reflection of the LIDAR output signal by an object located off the LIDAR chip. The LIDAR chip is configured to generate a composite signal that includes light from a comparative light signal and light from a reference signal. The comparative signal includes light from the LIDAR output signal but the reference signal does not include light from the LIDAR output signal.

15 Claims, 6 Drawing Sheets

(51) Int. Cl.
    *G01S 7/481*    (2006.01)
    *G01S 7/34*    (2006.01)

(56) References Cited

U.S. PATENT DOCUMENTS

| | | | |
|---|---|---|---|
| 9,625,580 | B2 | 4/2017 | Kotelnikov et al. |
| 10,739,256 | B1 * | 8/2020 | Rickman ............... G01S 7/4815 |
| 2006/0114447 | A1 | 6/2006 | Harris et al. |
| 2009/0195769 | A1 | 8/2009 | Luo et al. |
| 2015/0177383 | A1 | 6/2015 | Ruff et al. |
| 2016/0299228 | A1 | 10/2016 | Maleki et al. |
| 2017/0067985 | A1 | 3/2017 | Schwarz et al. |
| 2017/0269198 | A1 | 9/2017 | Hall et al. |
| 2017/0343652 | A1 | 11/2017 | de Mersseman et al. |
| 2019/0204443 | A1 * | 7/2019 | Yao .................... G02B 27/1086 |
| 2019/0346568 | A1 | 11/2019 | Feng et al. |
| 2020/0249350 | A1 * | 8/2020 | Schmalenberg ...... G01S 7/4911 |

OTHER PUBLICATIONS

Copenheaver, Blaine R., International Search Report and Written Opinion, PCT/US2020/033301, International Searching Authority, United States Patent and Trademark Office, dated Oct. 4, 2020.

Baghmisheh, B. B., "Chip-scale Lidar" University of California, Berkeley, Jan. 19, 2017, Technical Report No. UCB/EECS-2017-4, http://www2.eecs.berkeley.edu/Pubs/TechRpts/2017/EECS-2017-4.html.

Chan, M.K, "Atmospheric transmission windows for high energy short pulse lasers", Thesis, Naval Postgraduate School, Dec. 2003.

Cooksey, Catherine C. et al., "Reflectance measurements of human skin from the ultraviolet to the shortwave infrared (250 nm to 2500 nm)", 2018.

Farooq, S., "Spectral Reflectance of Land Covers", Retrieved from Department of Geology, Aligharh Muslim University: http://www.geol-amu.org/notes/m1r-1-8.htm, 2019.

Haran, T., "Short-wave infrared diffuse reflectance of Textile Materials", Thesis, Georgia State University, 2008.

Issakov, V., "Radar Systems, Ch. 2. In Microwave Circuits for 24GHz Automotive Radar in Silicon-based Technologies", Berlin Heidelberg: Springer-Verlag, 2010.

Kaasalainen, S., "The multispectral journey of Lidar", Retrieved from GIM International: https://www.gim-international.com/content/article/the-multispectral-journey-of-lidar, Jan. 24, 2019.

Kotthaus, S., et al., "Derivation of an urban materials spectral library through emittance and reflectance spectroscopy", ISPRS Journal of Photogrammetry and Remote Sensing, 94, 2014, 194-212.

Li, L., "Time-of-Flight Camera—An Introduction", TI Technical White Paper SLOA190B, 2014.

Pfennigbauer, M. et al., "Multi-Wavelength Airborne Laser Scanning", ILMF 2011. New Orleans, Feb. 7-9, 2011.

Schulmeister, Karl, "White Paper The new edition of the international laser product safety standard", IEC 60825-1, 2014.

Wojtanowski, J. et al., "Comparison of 905 nm and 1550 nm semiconductor laser rangefinders' performance deterioration due to adverse environmental conditions", Opto-Electronics Review, 22(3), 183-190, 2014.

Unterberger, Michael, Search Report, European Patent Office, Application No. 20810704.5, dated Jun. 27, 2023.

\* cited by examiner

WAVELENGTH SELECTION IN LIDAR SYSTEMS

RELATED APPLICATIONS

This application is a continuation of U.S. Patent Application Ser. No. 62/849,747, filed on May 17, 2019, entitled "Wavelength Selection in LIDAR Systems," and incorporated herein in its entirety.

FIELD

The invention relates to optical devices. In particular, the invention relates to LIDAR systems.

BACKGROUND

There is an increasing commercial demand for 3D sensing systems that can be economically deployed in applications such as ADAS (Advanced Driver Assistance Systems) and AR (Augmented Reality). LIDAR (Light Detection and Ranging) systems are an example of a technology that can be used to construct these 3D images. LIDAR systems build these images by illuminating a scene with light and measuring the light signals that return to the LIDAR system from the illuminated scene. However, lasers are often the sources of the light signals used in LIDAR systems. As a result, safety to skin and eyes is one of the challenges to increasing the number of LIDAR applications that are available. As a result, there is a need for LIDAR systems with increased safety levels.

SUMMARY

A Frequency Modulated Continuous Wave (FMCW) LIDAR system has a LIDAR chip configured to output a LIDAR output signal. The LIDAR chip is also configured to receive a LIDAR input signal from off of the LIDAR chip. The LIDAR input signal includes light from the LIDAR output signal after reflection of the LIDAR output signal by an object located off the LIDAR chip. The LIDAR chip is configured to generate a composite signal that includes light from a comparative light signal and light from a reference signal. The comparative signal includes light from the LIDAR output signal but the reference signal does not include light from the LIDAR output signal. The LIDAR output signal has a wavelength between 1290 nm and 1310 nm.

Another LIDAR system is configured to output multiple LIDAR output signals that are each concurrently directed to a sample region in a field of view. The sample region is one of multiple sample regions included in the field of view. The LIDAR output signals each carry a channel at a different wavelength. The wavelengths of the different channels are non-periodically spaced on the wavelength spectrum. The LIDAR system is configured to concurrently receive multiple LIDAR input signals that have each been reflected by an object located outside of the LIDAR system and within the sample region. The LIDAR input signals each includes light from a different one of the LIDAR output signals.

Another LIDAR system is configured to output multiple LIDAR output signals that are each concurrently directed to a sample region in a field of view. The sample region is one of multiple sample regions included in the field of view. The LIDAR output signals each carry a channel at a different wavelength. A difference between the wavelengths of the channels included in at least one channel pair is greater than 20 nm. The channels in each channel pair have wavelengths that are located adjacent to one another on the wavelength spectrum in that no other channel has a wavelength between the two channels included in each pair. The LIDAR system is configured to concurrently receive multiple LIDAR input signals that have each been reflected by an object located outside of the LIDAR system and within the sample region. The LIDAR input signals each includes light from a different one of the LIDAR output signals.

A method of generating and/or operating a LIDAR system includes identifying materials that might be included in an object that reflects LIDAR output signals from the LIDAR system back to the LIDAR system. The method also includes configuring multiple LIDAR output signals to each have a wavelength that has a higher reflectance for one of the identified materials than any of the other LIDAR output signals.

DESCRIPTION

Figure 1A:
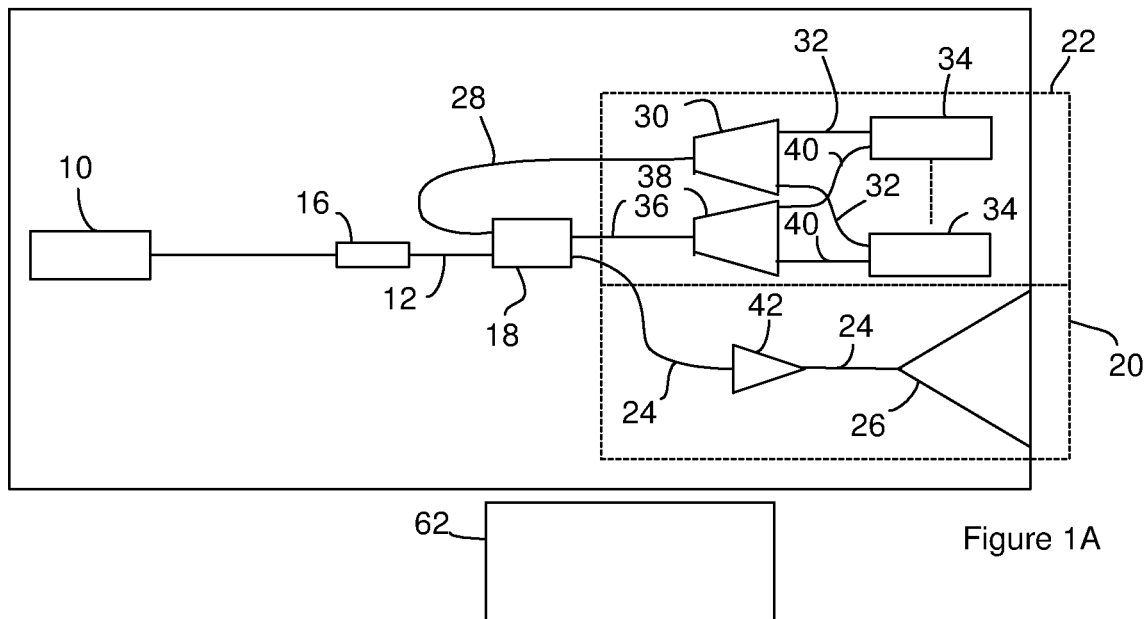
FIG. 1A is a schematic of a LIDAR system.

Four main factors affect the operational wavelength selected for the light signals output from LIDAR systems. These factors include safety for eyes and skin illuminated by the light from the LIDAR system. Another factor is the solar background activity at the chosen wavelength. High levels of solar background activity at the operating wavelength can interfere with the operation of the LIDAR system. Another one of the factors is atmospheric transmission of light at the selected wavelength. Low levels of atmospheric transmission reduce the amount of light that returns to the LIDAR system after being reflected off an object. Accordingly, low levels of transmission reduce the performance of the LIDAR system and increase the power levels required for successful operation. The fourth factor is reflectance of the light off the target object. Increasing the amount of light that is reflected increases the amount of light returned to the LIDAR system and accordingly improves the performance of the LIDAR system.

The inventors have surprisingly found that all four factors can be satisfied using an FMCW (Frequency Modulated Continuous Wave) LIDAR systems that outputs light signals in a narrow range of wavelengths. For eye and skin safety, the inventors have found that LIDAR output signals with a wavelength of 1290-1310 nm have MPE (Maximum Permissible Exposure according to international standard IEC 60825-1, 2014) levels in a range of 300 to 400 mW/cm$^2$. In contrast, the wavelengths typically used for optimal eye and skin safety typically have wavelengths of 1350-15500 nm. However, the MPE at these wavelengths is typically in a range of 100 to 200 mW/cm$^2$. As a result, LIDAR output signals with a wavelength of 1290-1310 nm actually enhance eye and skin safety above prior systems. Further, the use of an FMCW LIDAR system effectively removes the effects of solar background activity on the performance of the LIDAR system. Additionally, the inventors have found that wavelengths of 1290-1310 nm fall within one of the atmospheric transmission windows at 1280-1310 nm. In contrast, wavelengths of 1350-1390 nm fall mostly outside of the atmospheric transmission windows. Finally, in many applications such as facial recognition and self-driving vehicles, one of the targets is skin. Peaks in reflectance of skin are found at 1090 nm and at 1270 nm. As a result, the wavelength range of 1290 nm and 1310 nm takes advantage of one of these skin reflectance peaks. Accordingly, FMCW LIDAR system output signals with wavelengths in the range of 1290-1310 nm are able to satisfy all four of the factors for selecting an operational wavelength.

In some instances, the LIDAR system is configured to generate multiple LIDAR output signals that are scanned over a series of sample regions in a field of view. The different LIDAR output signals each carries a different channel but concurrently illuminate each of the sample regions during the scan. The LIDAR system can generate a LIDAR data (distance and/or radial velocity between the source of the LIDAR output signal and a reflecting object) result for each of the LIDAR output signals. As a result, the LIDAR can generate multiple LIDAR data results for each of the sample regions. The wavelengths of the different channels carried by the LIDAR output signals can be selected to be effective for particular materials that may be present in the field of view. As noted above, a channel with a wavelength in a range of 1290 nm to 1310 nm is effective and safe for use with skin. However, for some targets, channels in this wavelength range are not as reflective as channels at other wavelengths. As an example, the reflectance of metals such as dull aluminum and zinc is around 22% higher for wavelengths in a range of 1540-1560 nm than for wavelengths in the range of 1290-1310. As a result, a LIDAR output signal that carries a channel with a wavelength in a range of 1540 nm-1560 nm may provide more reliable LIDAR data results when a metal is in the field of view than a wavelength in a range of 1290-1310 nm. As a result, a LIDAR system that generates a LIDAR output signal that carries a channel with a wavelength of 1290-1310 nm and a LIDAR output signal that carries a channel with a wavelength of 1290-1310 nm can effectively generate LIDAR data for both skin and metals in a field of view. Accordingly, the use of LIDAR output signals with different wavelengths increases the range of materials for which LIDAR data can be reliably generated.

FIG. 1A is a topview of a LIDAR chip that includes a Frequency Modulated Continuous Wave (FMCW) LIDAR system where light from a LIDAR input signal that has been reflected off an object remote from the LIDAR chip is received by the LIDAR chip and combined with light from a reference light signal that has not been reflected by the object so as to generate a composite signal from which LIDAR data is generated. When there is a frequency differential between the reference light signal and the LIDAR input signal the composite signal can be a beating signal. The frequency differential can be a result of relative movement between the object and the LIDAR chip (i.e. the Doppler effect) and/or from use of a LIDAR output signal and a reference signal with a frequency that changes with time.

The system includes a light source 10 such as a laser that outputs an outgoing LIDAR signal. The outgoing LIDAR signal carries one or more different channels that are each at a different wavelength. In one example, the outgoing LIDAR signal carries one channel. In one example, the outgoing LIDAR signal carries one channel with a wavelength of 1290-1310 nm. In one example, the outgoing LIDAR signal carries multiple channels that are each at a different wavelength.

The LIDAR system also includes a utility waveguide 12 that receives an outgoing LIDAR signal from the light source 10. An amplifier 16 is optionally positioned along the utility waveguide 12. Since the power of the outgoing LIDAR signal is distributed among multiple channels, the amplifier 16 may be desirable to provide each of the channels with the desired power level on the utility waveguide 12. Suitable amplifiers include, but are not limited to, semiconductor optical amplifiers (SOAs).

The utility waveguide 12 carries the outgoing LIDAR signal to a signal-directing component 18. The signal-directing component 18 can direct the outgoing LIDAR signal to a LIDAR branch 20 and/or a data branch 22. The LIDAR branch outputs LIDAR output signals and receives LIDAR input signals. The data branch processes the LIDAR input signals for the generation of LIDAR data (distance and/or radial velocity between the source of the LIDAR output signal and a reflecting object).

The LIDAR branch includes a LIDAR signal waveguide 24 that receives at least a portion of the outgoing LIDAR signal from the signal-directing component 18. The LIDAR signal waveguide 24 carries at least a portion of the outgoing LIDAR signal to an output component 26 through which the outgoing LIDAR signal exits from the LIDAR chip. When the outgoing LIDAR signal includes multiple different channels at different wavelengths, the output component 26 can be configured such that each of the different channels is incident on the same sample region in the field of view. For instance, the output component 26 can be configured such that each of the different channels travels away from the LIDAR chip in the same direction or in substantially in the same direction.

After exiting from the output component 26, the different channels each serves as a LIDAR output signal where the LIDAR output signals are each at a different wavelength (channel). The LIDAR output signals can be reflected by a reflecting object (not shown) located outside of the LIDAR system. Each of the reflected LIDAR output signals returns to the output component 26 as a LIDAR input signal. The output component 26 receives the LIDAR input signals and outputs the result on the LIDAR signal waveguide 24 as an incoming LIDAR signal.

In some instances, the output component 26 also includes beam steering functionality. In these instances, the output component 26 can be in electrical communication with electronics (not shown) that can operate the output component 26 so as to steer the LIDAR output signals from one of the sample regions in a field of view to other sample regions in the field of view. The output component 26 and/or electronics can be configured such that the different LIDAR output signals are steered concurrently.

Although the output component 26 is illustrated as a single component, the output component 26 can include multiple optical components and/or electrical components. Suitable output components 26 include, but are not limited to, optical phased arrays (OPAs), transmission diffraction gratings, reflection diffraction gratings, and Diffractive Optical Elements (DOE). Suitable output components 26 with beam steering capability include, but are not limited to, optical phased arrays (OPAs) with active phase control elements on the array waveguides.

The LIDAR signal waveguide 24 carries the incoming LIDAR signal to the signal-directing component 18. The signal-directing component 18 directs the incoming LIDAR signal to the utility waveguide 12 and/or a comparative signal waveguide 28. The portion of the incoming LIDAR signal-directed to the comparative signal waveguide 28 serves a comparative incoming LIDAR signal.

The comparative signal waveguide 28 carries the comparative incoming LIDAR signal to a comparative demultiplexer 30. When the comparative light signal includes multiple channels, the comparative demultiplexer 30 divides the comparative incoming LIDAR signal into different comparative signals that each carries a different one of the channels. The comparative demultiplexer 30 outputs the comparative signals on different comparative waveguides 32. The comparative waveguides 32 each carry one of the comparative signals to different processing components 34. Accordingly, the different processing components 34 each receives a comparative signal carrying a different one of the channels.

The signal-directing component 18 is configured such that when the signal-directing component 18 directs at least a portion of the incoming LIDAR signal to the comparative waveguide 32, the signal-directing component 18 also directs at least a portion of the outgoing LIDAR signal to a reference signal waveguide 36. The portion of the outgoing LIDAR signal received by the reference signal waveguide 36 serves as a reference light signal.

The reference signal waveguide 36 carries the reference light signal to a reference demultiplexer 38. When the reference light signal carries multiple channels, the reference demultiplexer 38 divides the reference light signal into different reference signals that each carries a different one of the channels. The reference demultiplexer 38 outputs the reference signals on different reference waveguides 40. The reference waveguides 40 each carry one of the reference signals to a different one of the processing components 34. Accordingly, the different processing components 34 each receives a reference signal carrying a different one of the channels.

The comparative waveguides 32 and the reference waveguides 40 are configured such that a comparative signal and the corresponding reference signal are received at the same processing component 34. For instance, the comparative waveguides 32 and the reference waveguides 40 are configured such that the comparative signal and the corresponding reference signal of the same wavelength are received at the same processing component 34. Accordingly, the different processing components 34 each receives the comparative signal and the reference signal carrying the same channel.

As will be described in more detail below, the processing components 34 each combines a comparative signal with the corresponding reference signal to form a composite signal that carries LIDAR data for a sample region on the field of view. Accordingly, the composite signal can be processed so as to extract LIDAR data for the sample region.

The signal-directing component 18 can be an optical coupler. When the signal-directing component 18 is an optical coupler, the signal-directing component 18 directs a first portion of the outgoing LIDAR signal to the LIDAR signal waveguide 24 and a second portion of the outgoing LIDAR signal to the reference signal waveguide 36 and also directs a first portion of the incoming LIDAR signal to the utility waveguide 12 and a second portion of the incoming LIDAR signal to the comparative signal waveguide 28. Accordingly, the second portion of the incoming LIDAR signal can serve as the comparative incoming LIDAR signal and the second portion of the outgoing LIDAR signal can serve as the reference light signal.

The signal-directing component 18 can be an optical switch such as a cross-over switch. A suitable cross-over switch can be operated in a cross mode or a pass mode. In the pass mode, the outgoing LIDAR signal is directed to the LIDAR signal waveguide 24 and an incoming LIDAR signal would be directed to the utility waveguide 12. In the cross mode, the outgoing LIDAR signal is directed to the reference signal waveguide 36 and the incoming LIDAR signal is directed to the comparative signal waveguide 28. Accordingly, the incoming LIDAR signal or a portion of the incoming LIDAR signal can serve as the comparative light signal and the outgoing LIDAR signal or a portion of the outgoing LIDAR signal can serve as the reference light signal.

An optical switch such as a cross-over switch can be controlled by the electronics. For instance, the electronics can control operate the switch such that the switch is in the cross mode or a pass mode. When LIDAR output signals are to be transmitted from the LIDAR system, the electronics operate the switch such that the switch is in the pass mode. When LIDAR input signals are to be received by the LIDAR system, the electronics operate the switch such that the switch is in the cross-over mode. The use of a switch can provide lower levels of optical loss than are associated with the use of an optical coupler as the signal-directing component 18.

In the above descriptions of the operation of the signal-directing component 18, the comparative light signals and the reference light signals are concurrently directed to the data branch. As a result, the processing components 34 can each combine a comparative signal with the corresponding reference signal.

In some instances, an optical amplifier 42 is optionally positioned along the LIDAR signal waveguide 24 and is configured to provide amplification of the outgoing LIDAR signal and/or of the incoming LIDAR signal. Accordingly, the effects of optical loss at the signal-directing component 18 can be reduced.

Figure 1B:
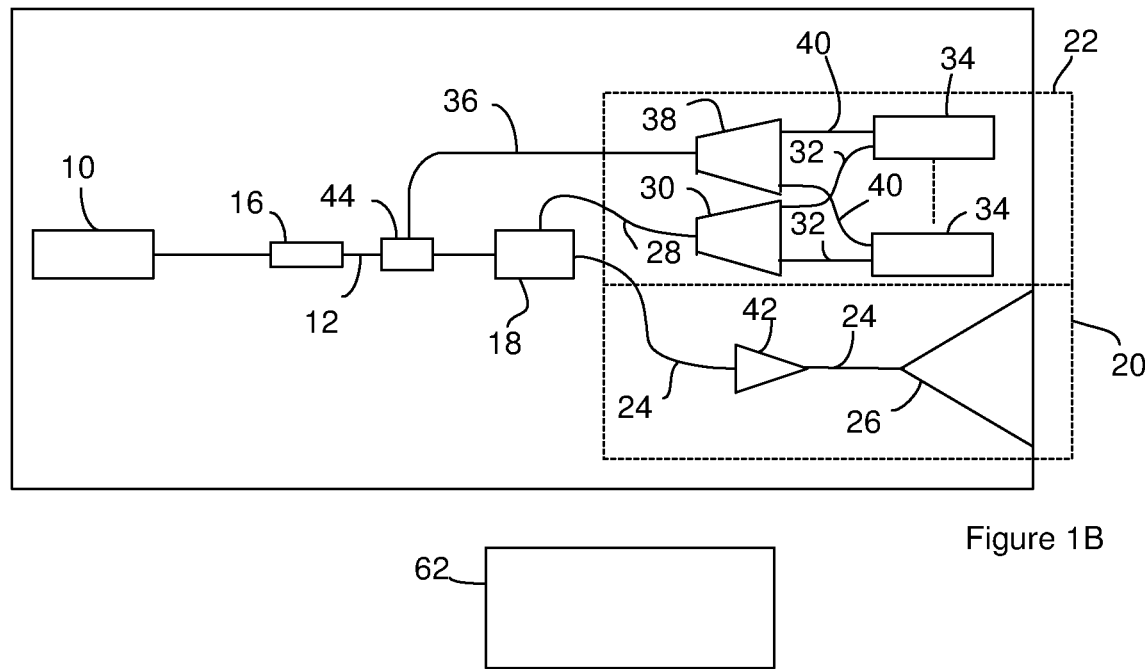
FIG. 1B is a schematic of another embodiment of a LIDAR system.

FIG. 1B illustrates the LIDAR system of FIG. 1A modified to include an optical circulator as the signal-directing component 18. The optical circulator is configured such that the outgoing LIDAR signal is directed to the LIDAR signal waveguide 24 and the incoming LIDAR signal is directed to the comparative signal waveguide 28. The comparative signal waveguide 28 carries the comparative incoming LIDAR signal to the comparative demultiplexer 30. Additionally, a tap component 44 is positioned along the utility waveguide 12. The tap component 44 is configured to tap off a first portion of the outgoing LIDAR signal such that the first portion of the outgoing LIDAR signal is received on the reference signal waveguide 36. The first portion of the outgoing LIDAR signal received by the reference signal waveguide 36 serves as the reference light signal. The reference signal waveguide 36 carries the reference light signal to the reference demultiplexer 38. Accordingly, the electronics can operate the LIDAR system of FIG. 1B as disclosed in the context of FIG. 1A. Suitable optical circulators include, but are not limited to, Faraday rotator based optical fiber circulators, and integrated optical circulators. Although the signal-directing component 18 of FIG. 1B is disclosed as an optical circulator, the signal-directing component 18 of FIG. 1B can be an optical coupler or optical switch.

Figure 2A:
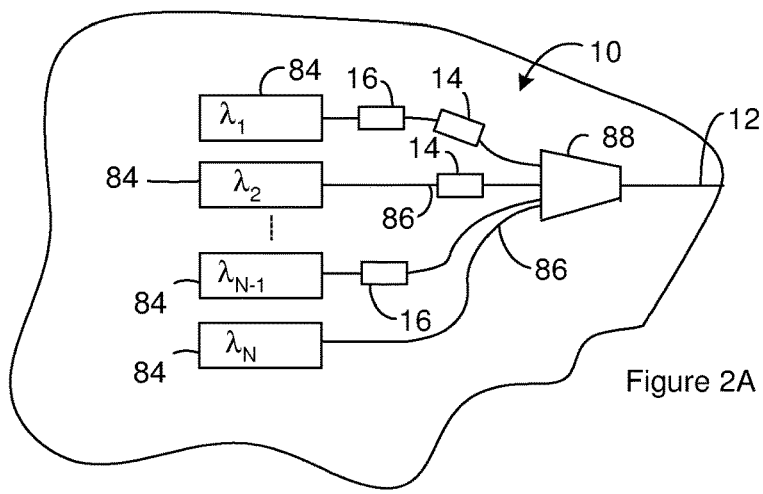
FIG. 2A illustrates a light source that includes multiple laser sources.

FIG. 2A illustrates an example of a light source 10 that includes multiple laser sources 84. In some instances, each of the laser sources 84 outputs one or more of the channels on a source waveguide 86. The source waveguides 86 carry the channels to a laser multiplexer 88 that combines the channels so as to form a light signal that is received on a channel waveguide or the utility waveguide 12. Suitable laser multiplexers 88 include, but are not limited to, Arrayed Waveguide Grating (AWG) multiplexers, echelle grating multiplexers, and star couplers. The electronics can operate the laser sources 84 so the laser sources 84 concurrently output each of the channels. The electronics can operate the laser sources 84 so the laser sources 84 concurrently output each of the channels.

In some instances, each of the laser sources 84 outputs one of the channels on a source waveguide 86. The total number of laser sources 84 included in the light source 10 can be greater than or equal to the number of LIDAR output signals that are concurrently directed to a sample region. In some instances, the total number of laser sources 84 included in the light source 10 is equal to the number of LIDAR output signals that are concurrently directed to a sample region. As a result, each laser source 84 can be the source of a different one of the LIDAR output signals that are concurrently directed to a sample region.

The electronics can operate the laser sources 84 independently. For instance, the electronics can operate the laser sources 84 so as to provide particular LIDAR output signal(s) with a particular frequency versus time waveform. Since the electronics can operate the laser sources 84 independently and each laser sources 84 can be the source of a different one of the LIDAR output signals, the electronics can operate the laser sources 84 so different LIDAR output signals have different frequency versus time waveforms.

A modulator 14 can optionally be positioned along one or more of the source waveguides 86. The modulators 14 can each be configured to modulate the power of one of the channels and accordingly the amplitude of the resulting LIDAR output signal(s). The electronics can operate the modulator 14. Accordingly, the electronics can modulate the power of the LIDAR output signal(s). Suitable modulators 14 include, but are not limited to, PIN diode carrier injection devices, Mach-Zehnder modulator devices, and electro-absorption modulator devices. When the modulator 14 is constructed on a silicon-on-insulator platform, a suitable modulator is disclosed in U.S. patent application Ser. No. 617,810, filed on Sep. 21, 1993, entitled Integrated Silicon PIN Diode Electro-Optic Waveguide, and incorporated herein in its entirety.

An amplifier 16 can optionally be positioned along one or more of the source waveguides 86. The modulators 16 can each be configured to modulate the intensity of one of the channels and accordingly the power of the resulting LIDAR output signal(s). The electronics can operate the modulators 16. Accordingly, the electronics can amplify the power of one or more of the LIDAR output signal(s). Suitable amplifiers 16 include, but are not limited to, fiber amplifiers such as erbium doped fiber amplifiers (EDFAs) or praseodymium doped fiber amplifiers (PDFAs), and semiconductor optical amplifiers (SOAs).

The electronics can operate the modulators 14 and/or the laser sources 84 so as to provide different LIDAR output signals with different waveforms. For instance, the electronics can operate one or more laser sources 84 to each produce a LIDAR output signal with a frequency that is not a function of time such as a continuous wave. Additionally or alternately, the electronics can operate one or more laser sources 84 and associated modulator(s) 14 so as to generate one or more LIDAR output signals that each has a chirped amplitude. Additionally or alternately, the electronics operate one or more laser sources 84 and associated modulator(s) 14 so as to generate one or more of the LIDAR output signal with a frequency that varies with time. In one example, the electronics can operate one or more laser sources 84 and/or the associated modulator(s) 14 so as to generate at least one LIDAR output signal with an electrical field that is a function of a sinusoid that has a frequency that is a function of time. In another example, each of the source waveguides 86 excludes a modulator 14 and the electronics operate one or more laser sources 84 and/or the associated modulator(s) 14 so as to generate at least one LIDAR output signal with an electrical field that is a function of a sinusoid that has a frequency that is a function of time.

During operation of the LIDAR system, the generation of LIDAR data is divided into a series of cycles where LIDAR data is generated for each cycle. In some instances, each of the cycles corresponds to a different sample region in the field of view. Accordingly, different cycles can generate LIDAR data for different regions in a field of view. The cycles can be performed such that the duration of each cycle can be divided into different time periods. For instance, the duration of a cycle can include one or more data periods where the LIDAR input signals are generated and received at the LIDAR chip and one or more re-location periods where the LIDAR output signal is moved from one sample region to another sample region. In a continuous scan mode, the cycle does not include any re-location periods and the LIDAR output signal is moved continuously. In one example, the cycles include multiple data periods; multiple LIDAR output signals each carries a different channel; and the LIDAR output signals are concurrently directed to the same sample region in a field of view. In one example, at least one of the LIDAR output signals is a function of a sinusoid with a frequency that varies as a function of time. In one example, each of the LIDAR output signals is a function of a sinusoid with a frequency that varies as a function of time.

Figure 2B:
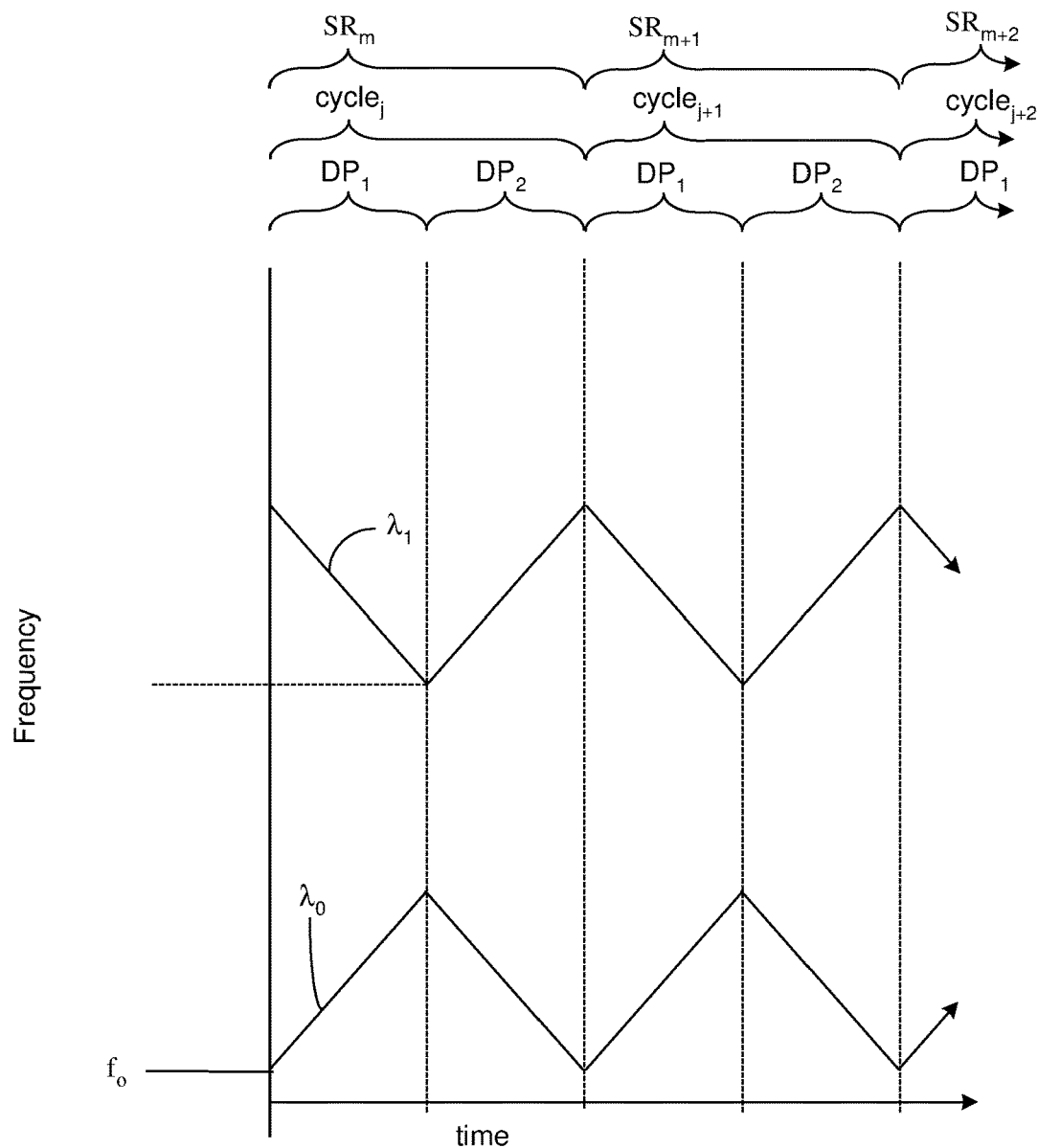
FIG. 2B illustrates the frequencies of LIDAR output signals that carry different channels as a function of time.

FIG. 2B presents an example of a scheme for tuning the LIDAR output signals. The frequency is shown for a sequence of several cycles that are each labeled $cycle_j$ through $cycle_{j+2}$. Each cycle includes K data periods that are each associated with a cycle index k and are labeled $DP_k$. In the example of FIG. 2B, each cycle includes two data periods labeled $DP_k$ with k=1 and k=1. Each of the illustrated cycles corresponds to one of M different sample regions that are each associated with a cycle index m and are labeled $SR_m$ through $SR_{m+2}$. Accordingly, in the illustrated example, the LIDAR data generated in each cycle is for a different sample region although other configurations are possible. Since there are no re-location periods illustrated, the LIDAR system is being operated with a continuous scan or without a scan.

In the example of FIG. 2B, the LIDAR output signals each carries a channel labeled $\lambda_i$ where i is a channel index that is an integer and starts at 0. The electrical field of each channel is a function of a sinusoid with a frequency shown in FIG. 2B. The LIDAR output signals $\lambda_0$ and $\lambda_1$ each has an electrical field that is a function of a sinusoid with a frequency that changes with time. During the same data period, the frequency change for $\lambda_0$ and $\lambda_1$ is in the opposite direction but at the same rate. As a result, FIG. 2B shows a sample region that is concurrently illuminated by at least one LIDAR output signal with an increasing frequency and at least one LIDAR output signal with a decreasing frequency where the rate of the frequency change is the same.

In one example, the electrical field for the LIDAR output signals for each of the channels shown in FIG. 2B can be a function of a sinusoid with a frequency represented by the following equations: (Equation 1) $f=f_i+0.5*\alpha_i*DP*[(-1)^j+1]+(-1)^{(j-1)}\{t-[(j-1)(DP)]\}\alpha_i$; (Equation 2) and $f=f_i+0.5*\alpha_i*DP*[(-1)^{(j+1)}+1]-(-1)^{(j-1)}\{t-[(j-1)](DP)\}\alpha_i$ where $\alpha_i$ represents the rate of frequency change for channel i during the data period and $f_i$ represents the lowest frequency of channel i during a cycle (the base frequency). The variable t represents time where t=0 at the start of each new cycle and/or at the start of each $DP_k$. FIG. 2B illustrates an example where $\alpha_0=\alpha_1$. In some instances, the values of $f_i$ are selected such that there is no overlap in the frequencies of the different LIDAR output signals as is illustrated in FIG. 2B. In one example, the electrical field for the LIDAR output signals is represented by the following mathematical equation: $N*\cos(2\pi*_i*t+E*t^2)$ wherein N and E are constants, and E can be zero or non-zero, N≠0, and, in some instances, f is the frequency provided by Equation 1 or Equation 2.

In FIG. 2B, the channel labeled $\lambda_0$ has an electrical field that is a function of a sinusoid with a frequency represented by Equation 1, and $\lambda_1$ has an electrical field that is a function of a sinusoid with a frequency represented by Equation 2. Although FIG. 2B illustrates one channel with a frequency according to each one of Equation 1 and Equation 2; the LIDAR system can generate more than one LIDAR output signal with an electrical field that is a function of a sinusoid with a frequency represented by an equation selected from a group consisting of Equation 1 and Equation 2. Additionally or alternately, the one or more LIDAR output signals generated by the LIDAR system can exclude any LIDAR output signals with an electrical field that is a function of a sinusoid with a frequency represented by an equation selected from a group consisting of Equation 1 and Equation 2. Accordingly, the one or more LIDAR output signals generated by the LIDAR system can only be LIDAR output signals with an electrical field that is a function of a sinusoid with a frequency represented by an equation selected from a group consisting of Equation 1 and Equation 2.

One example of a LIDAR system includes a light source constructed according to FIG. 2A where the light source is configured to generate two LIDAR output signals. One of the LIDAR output signals carries a channel with a frequency versus time according to channel $\lambda_0$ of FIG. 2B and the other LIDAR output signal carries a channel with a frequency versus time according to channel $\lambda_1$ of FIG. 2B. The number of processing components 34 included in the LIDAR system can match the number of LIDAR output signals that each carries a different channel. Accordingly, the LIDAR system can be constructed according to FIG. 1A with two processing components 34. Although FIG. 2B illustrates the frequency versus time waveform for two different channels, the LIDAR system can be configured to output more than two LIDAR output signals that each carries a different channel.

Laser sources 84 for use with a light source 10 constructed according to FIG. 2A can be selected to be efficient for the wavelength of channel(s) output by the laser source 84. For instance, laser sources with gain media that include or consist of quantum dots efficiently output light with wavelengths of 1290 to 1310 nm and laser sources with gain media that include quantum wells efficiently output light with wavelengths of 1480 to 1550 nm. Accordingly, the light source 10 can include multiple laser sources where different laser sources have different gain media. In some instances, the laser system includes one, more than one, or two laser sources selected from a group consisting of laser sources with a gain medium that include or consist of quantum dots, and laser sources with a gain medium that includes quantum wells. In one example, the laser system includes a light source 10 that includes one or more laser sources and is constructed such that at least a portion of the laser sources have a gain medium that include or consist of quantum dots and outputs a channel with a wavelength in a range of 1290 to 1310 nm. Suitable laser constructions include, but are not limited to, external cavity lasers, distributed feedback lasers (DFBs), and Fabry-Perot (FP) lasers. External cavity lasers can be advantageous in this embodiment because of their generally narrower linewidths, which can reduce noise in the detected signal.

Although FIG. 2A illustrates each of the light sources 84, any modulators 14, and any amplifiers 16 as being integrated with and/or located on the LIDAR chip, one or more components selected from the group consisting of the light sources 84, any modulators 14, and any amplifiers 16 can be external to the LIDAR chip and connected to the LIDAR chip and/or other ones of the components with a waveguide such as an optical fiber.

Figure 3A:
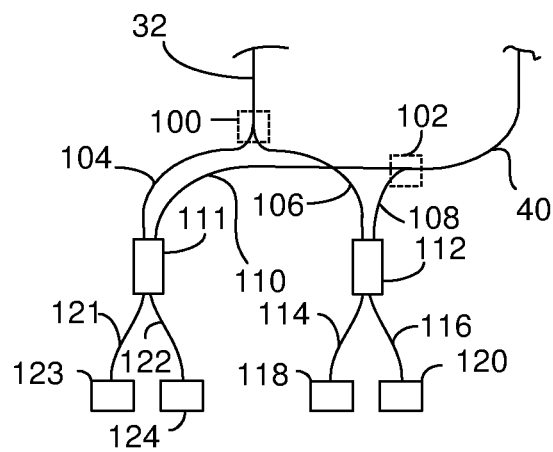
FIG. 3A illustrates an example of a processing unit suitable for use with the LIDAR system of FIG. 1A and/or FIG. 1B.
Figure 3B:
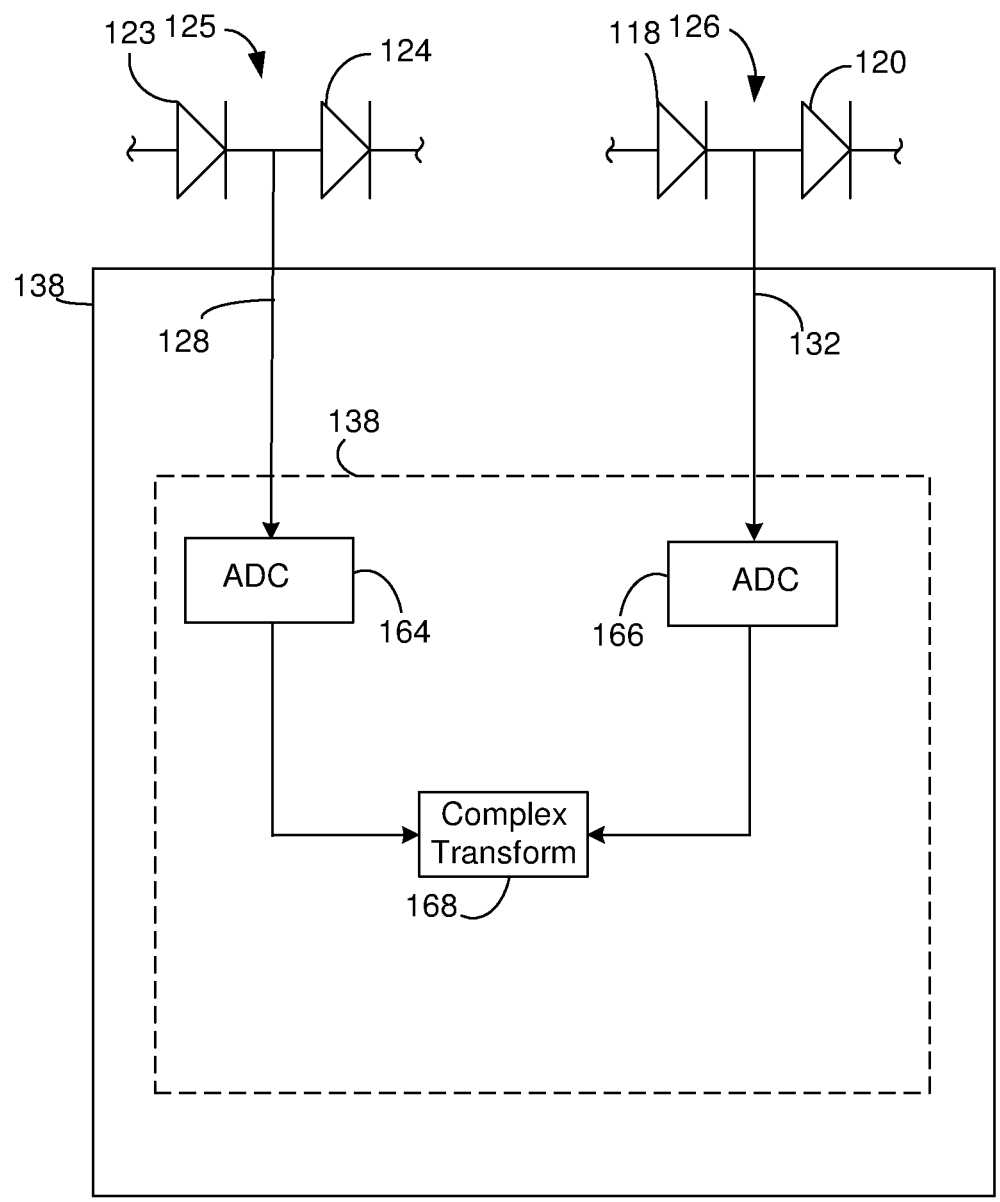
FIG. 3B provides a schematic of electronics that are suitable for use with a processing unit constructed according to FIG. 3A.

FIG. 3A through FIG. 3B illustrate an example of suitable processing components 34 for use in the LIDAR system of FIG. 1A and FIG. 1B. The processing unit includes a first splitter 102 that divides a reference signal carried on a reference waveguide 40 onto a first reference waveguide 110 and a second reference waveguide 108. The first reference waveguide 110 carries a first portion of the reference signal to a light-combining component 111. The second reference waveguide 108 carries a second portion of the reference signal to a second light-combining component 112.

The processing unit includes a second splitter 100 that divides the comparative signal carried on the comparative waveguide 32 onto a first comparative waveguide 104 and a second comparative waveguide 106. The first comparative waveguide 104 carries a first portion of the comparative signal to the light-combining component 111. The second comparative waveguide 108 carries a second portion of the comparative signal to the second light-combining component 112.

The second light-combining component 112 combines the second portion of the comparative signal and the second portion of the reference signal into a second composite signal. Due to the difference in frequencies between the second portion of the comparative signal and the second portion of the reference signal, the second composite signal is beating between the second portion of the comparative signal and the second portion of the reference signal.

The second light-combining component 112 also splits the resulting second composite signal onto a first auxiliary detector waveguide 114 and a second auxiliary detector waveguide 116. The first auxiliary detector waveguide 114 carries a first portion of the second composite signal to a first auxiliary light sensor 118 that converts the first portion of the second composite signal to a first auxiliary electrical signal.

The second auxiliary detector waveguide 116 carries a second portion of the second composite signal to a second auxiliary light sensor 120 that converts the second portion of the second composite signal to a second auxiliary electrical signal. Examples of suitable light sensors include germanium photodiodes (PDs), and avalanche photodiodes (APDs).

In some instances, the second light-combining component 112 splits the second composite signal such that the portion of the comparative signal (i.e. the portion of the second portion of the comparative signal) included in the first portion of the second composite signal is phase shifted by 180° relative to the portion of the comparative signal (i.e. the portion of the second portion of the comparative signal) in the second portion of the second composite signal but the portion of the reference signal (i.e. the portion of the second portion of the reference signal) in the second portion of the second composite signal is not phase shifted relative to the portion of the reference signal (i.e. the portion of the second portion of the reference signal) in the first portion of the second composite signal. Alternately, the second light-combining component 112 splits the second composite signal such that the portion of the reference signal (i.e. the portion of the second portion of the reference signal) in the first portion of the second composite signal is phase shifted by 180° relative to the portion of the reference signal (i.e. the portion of the second portion of the reference signal) in the second portion of the second composite signal but the portion of the comparative signal (i.e. the portion of the second portion of the comparative signal) in the first portion of the second composite signal is not phase shifted relative to the portion of the comparative signal (i.e. the portion of the second portion of the comparative signal) in the second portion of the second composite signal. Examples of suitable light sensors include germanium photodiodes (PDs), and avalanche photodiodes (APDs).

The first light-combining component 111 combines the first portion of the comparative signal and the first portion of the reference signal into a first composite signal. Due to the difference in frequencies between the first portion of the comparative signal and the first portion of the reference signal, the first composite signal is beating between the first portion of the comparative signal and the first portion of the reference signal.

The light-combining component 111 also splits the first composite signal onto a first detector waveguide 121 and a second detector waveguide 122. The first detector waveguide 121 carries a first portion of the first composite signal to a first light sensor 123 that converts the first portion of the second composite signal to a first electrical signal. The second detector waveguide 122 carries a second portion of the second composite signal to a second auxiliary light sensor 124 that converts the second portion of the second composite signal to a second electrical signal. Examples of suitable light sensors include germanium photodiodes (PDs), and avalanche photodiodes (APDs).

In some instances, the light-combining component 111 splits the first composite signal such that the portion of the comparative signal (i.e. the portion of the first portion of the comparative signal) included in the first portion of the composite signal is phase shifted by 180° relative to the portion of the comparative signal (i.e. the portion of the first portion of the comparative signal) in the second portion of the composite signal but the portion of the reference signal (i.e. the portion of the first portion of the reference signal) in the first portion of the composite signal is not phase shifted relative to the portion of the reference signal (i.e. the portion of the first portion of the reference signal) in the second portion of the composite signal. Alternately, the light-combining component 111 splits the composite signal such that the portion of the reference signal (i.e. the portion of the first portion of the reference signal) in the first portion of the composite signal is phase shifted by 180° relative to the portion of the reference signal (i.e. the portion of the first portion of the reference signal) in the second portion of the composite signal but the portion of the comparative signal (i.e. the portion of the first portion of the comparative signal) in the first portion of the composite signal is not phase shifted relative to the portion of the comparative signal (i.e. the portion of the first portion of the comparative signal) in the second portion of the composite signal.

When the second light-combining component 112 splits the second composite signal such that the portion of the comparative signal in the first portion of the second composite signal is phase shifted by 180° relative to the portion of the comparative signal in the second portion of the second composite signal, the light-combining component 111 also splits the composite signal such that the portion of the comparative signal in the first portion of the composite signal is phase shifted by 180° relative to the portion of the comparative signal in the second portion of the composite signal. When the second light-combining component 112 splits the second composite signal such that the portion of the reference signal in the first portion of the second composite signal is phase shifted by 180° relative to the portion of the reference signal in the second portion of the second composite signal, the light-combining component 111 also splits the composite signal such that the portion of the reference signal in the first portion of the composite signal is phase shifted by 180° relative to the portion of the reference signal in the second portion of the composite signal.

The first reference waveguide 110 and the second reference waveguide 108 are constructed to provide a phase shift between the first portion of the reference signal and the second portion of the reference signal. For instance, the first reference waveguide 110 and the second reference waveguide 108 can be constructed so as to provide a 90 degree phase shift between the first portion of the reference signal and the second portion of the reference signal. As an example, one reference signal portion can be an in-phase component and the other a quadrature component. Accordingly, one of the reference signal portions can be a sinusoidal function and the other reference signal portion can be a cosine function. In one example, the first reference waveguide 110 and the second reference waveguide 108 are constructed such that the first reference signal portion is a cosine function and the second reference signal portion is a sine function. Accordingly, the portion of the reference signal in the second composite signal is phase shifted relative to the portion of the reference signal in the first composite signal, however, the portion of the comparative signal in the first composite signal is not phase shifted relative to the portion of the comparative signal in the second composite signal.

The first light sensor 123 and the second light sensor 124 can be connected as a balanced detector and the first auxiliary light sensor 118 and the second auxiliary light sensor 120 can also be connected as a balanced detector. For instance, FIG. 3B provides a schematic of the relationship between the electronics, the first light sensor 123, the second light sensor 124, the first auxiliary light sensor 118, and the second auxiliary light sensor 120. The symbol for a photodiode is used to represent the first light sensor 123, the second light sensor 124, the first auxiliary light sensor 118, and the second auxiliary light sensor 120 but one or more of these sensors can have other constructions. In some instances, all of the components illustrated in the schematic of FIG. 3B are included on the LIDAR chip. In some instances, the components illustrated in the schematic of FIG. 3B are distributed between the LIDAR chip and electronics located off of the LIDAR chip.

The electronics connect the first light sensor 123 and the second light sensor 124 as a first balanced detector 125 and the first auxiliary light sensor 118 and the second auxiliary light sensor 120 as a second balanced detector 126. In particular, the first light sensor 123 and the second light sensor 124 are connected in series. Additionally, the first auxiliary light sensor 118 and the second auxiliary light sensor 120 are connected in series. The serial connection in the first balanced detector is in communication with a first data line 128 that carries the output from the first balanced detector as a first data signal. The serial connection in the second balanced detector is in communication with a second data line 132 that carries the output from the second balanced detector as a second data signal. The first data signal is an electrical representation of the first composite signal and the second data signal is an electrical representation of the second composite signal. Accordingly, the first data signal includes a contribution from a first waveform and a second waveform and the second data signal is a composite of the first waveform and the second waveform. The portion of the first waveform in the first data signal is phase-shifted relative to the portion of the first waveform in the first data signal but the portion of the second waveform in the first data signal being in-phase relative to the portion of the second waveform in the first data signal. For instance, the second data signal includes a portion of the reference signal that is phase shifted relative to a different portion of the reference signal that is included the first data signal. Additionally, the second data signal includes a portion of the comparative signal that is in-phase with a different portion of the comparative signal that is included in the first data signal. The first data signal and the second data signal are beating as a result of the beating between the comparative signal and the reference signal, i.e. the beating in the first composite signal and in the second composite signal.

The electronics 62 includes a transform mechanism 138 configured to perform a mathematical transform on the first data signal and the second data signal. For instance, the mathematical transform can be a complex Fourier transform with the first data signal and the second data signal as inputs. Since the first data signal is an in-phase component and the second data signal its quadrature component, the first data signal and the second data signal together act as a complex data signal where the first data signal is the real component and the second data signal is the imaginary component of the input.

The transform mechanism 138 includes a first Analog-to-Digital Converter (ADC) 164 that receives the first data signal from the first data line 128. The first Analog-to-Digital Converter (ADC) 164 converts the first data signal from an analog form to a digital form and outputs a first digital data signal. The transform mechanism 138 includes a second Analog-to-Digital Converter (ADC) 166 that receives the second data signal from the second data line 132. The second Analog-to-Digital Converter (ADC) 166 converts the second data signal from an analog form to a digital form and outputs a second digital data signal. The first digital data signal is a digital representation of the first data signal and the second digital data signal is a digital representation of the second data signal. Accordingly, the first digital data signal and the second digital data signal act together as a complex signal where the first digital data signal acts as the real component of the complex signal and the second digital data signal acts as the imaginary component of the complex data signal.

The transform mechanism 138 includes a transform component 168 that receives the complex data signal. For instance, the transform component 168 receives the first digital data signal from the first Analog-to-Digital Converter (ADC) 164 as an input and also receives the second digital data signal from the first Analog-to-Digital Converter (ADC) 166 as an input. The transform component 168 can be configured to perform a mathematical transform on the complex signal so as to convert from the time domain to the frequency domain. The mathematical transform can be a complex transform such as a complex Fast Fourier Transform (FFT). A complex transform such as a complex Fast Fourier Transform (FFT) provides an unambiguous solution for the shift in frequency of LIDAR input signal relative to the LIDAR output signal that is caused by the radial velocity between the reflecting object and the LIDAR chip. The transform component 168 can execute the attributed functions using firmware, hardware or software or a combination thereof.

Figure 3C:
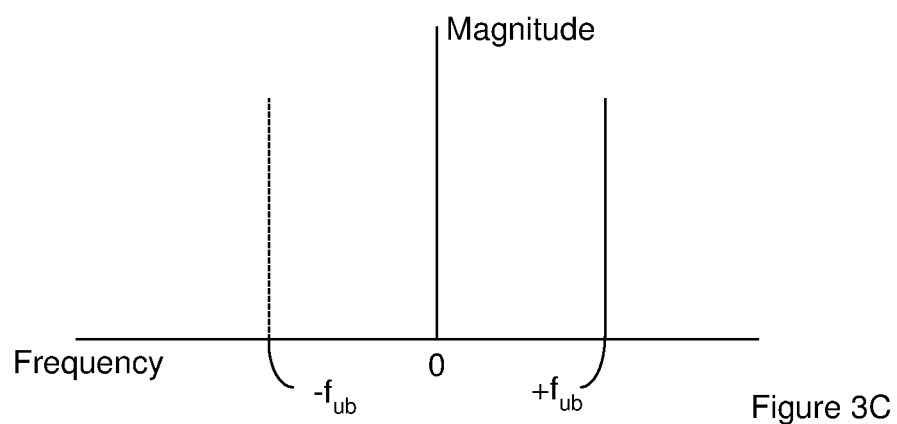
FIG. 3C is a graph of magnitude versus frequency. A solid line on the graph shows results for a Complex Fourier transform.

The solid line in FIG. 3C provides an example of the output of the transform mechanism when a Complex Fourier transform converts the input from the time domain to the frequency domain. The solid line shows a single frequency peak. The frequency associated with this peak is used by the electronics as the shift in frequency of LIDAR input signal relative to the LIDAR output signal is caused by the radial velocity between the reflecting object and the LIDAR chip and/or the distance between the reflecting object and the LIDAR chip. When the LIDAR output signal has a frequency that does not change with time as shown by $\lambda_2$ of FIG. 2B, the shift in frequency of LIDAR input signal relative to the LIDAR output signal that is caused by the radial velocity between the reflecting object and the LIDAR chip and not by the distance between the reflecting object and the LIDAR chip. The electronics use the frequency output from the transform component 168 for further processing to generate the LIDAR data (distance and/or radial velocity between the reflecting object and the LIDAR chip or LIDAR system).

FIG. 3C also includes a second peak illustrated by a dashed line. Prior methods of resolving the frequency of the LIDAR input signal made use of real Fourier transforms rather than the Complex Fourier transform technique disclosed above. These prior methods output both the peak shown by the dashed line and the solid line. Accordingly, the prior methods output multiple different frequencies that are both associated with a single object in the sample region in that each of the associated frequencies would not be present if the object were removed from the sample region. As noted above, when using LIDAR applications, it can become difficult to identify the correct peak. Since the above technique for resolving the frequency generates a single solution for the frequency, the inventors have resolved the ambiguity with the frequency solution.

The electronics use the single frequency represented by the solid line in FIG. 3C to generate LIDAR data. For instance, the following equation applies during a data period where the frequency of the LIDAR output is increases during the data period such as occurs with the LIDAR output signal $\lambda_0$ of FIG. 2B during the data periods labeled $DP_1$: $+f_{ub} = -f_d + \alpha \tau_0$ where $f_{ub}$ is the frequency provided by the transform component, $f_d$ represents the Doppler shift ($f_d=2vf_c/c$) where $f_c$ is the frequency of the LIDAR output signal at the start of the data period (i.e. t=0), v is the radial velocity between the reflecting object and the LIDAR chip where the direction from the reflecting object toward the chip is assumed to be the positive direction, and c is the speed of light, α represents the rate at which the frequency of the outgoing LIDAR signal is increased or decreased during the period, and $\tau_0$ is the roundtrip delay (time between the LIDAR output signal exiting from the LIDAR chip and the associated LIDAR input signal returning to the LIDAR chip) for a stationary reflecting object. The following equation applies during a data period where electronics decrease the frequency of the LIDAR output signal during the data period such as occurs with the LIDAR output signal $\lambda_1$ of FIG. 2B during the data periods labeled $DP_2$: $-f_{db}=-f_d-\alpha\tau_0$ where $f_{db}$ is the frequency provided by the transform mechanism. In these two equations, $f_d$ and $\tau_0$ are unknowns. These two equations are solved for the two unknowns $f_d$ and $\tau_0$. The values of $f_{db}$ and $f_{ub}$ that are substituted into the solution come from the same channel and accordingly the same processing units (labeled 34 in FIG. 1A and FIG. 1B), but during different data periods in the same cycle. Since the cycles is associated with a sample region in the field of view, the solution yields the values of $f_d$ and $\tau_0$ for a sample region in the field of view. The radial velocity for that sample region can then be determined from the Doppler shift ($v=c*f_d/(2f_c)$) and the separation distance for that sample region can be determined from $c*\tau_0/2$. As a result, the LIDAR data for a sample regions is determined for a single LIDAR output signal (channel) that illuminates the sample region.

As discussed above, the LIDAR system can output more than two LIDAR output signals that each carries a different channel. For instance, the LIDAR system can output three LIDAR output signals that have frequency versus time waveforms according to FIG. 2B. The LIDAR output signals can be concurrently directed to the same sample region in a field of view. Additionally, the LIDAR output signals can be sequentially scanned across a series of the sample regions such that each LIDAR output signal is concurrently directed to each of the sample regions in the sequence. In some instances, the sequence includes all of the sample regions in the field of view.

Since the LIDAR system can generate a LIDAR data result for each channel that concurrently illuminates a sample region, the LIDAR system can generate multiple LIDAR data results for each sample region. The wavelengths of the different channels can be selected to be effective for particular materials that may be present in the field of view. As noted above, a channel with a wavelength in a range of 1290 nm to 1310 nm is effective for use with skin. However, other wavelengths are more effective for many metals due to an increased reflectance. For instance, channels with a wavelength in a range of 1540-1560 nm have a higher reflectance for many metals. As an example, the reflectance of metals such as dull aluminum and zinc is around 22% higher for wavelength in a range of 1540-1560 nm than for wavelengths in a range of 1290-1310. In contrast, the skin reflectance factor for wavelengths in a range of 1290-1310 is more than three times that of wavelength in a range of 1540-1560 nm. As a result, when the LIDAR system that generates LIDAR output signals such that at least one LIDAR output signal has a wavelength in a range of 1540-1560 nm and at least one LIDAR output signal has a wavelength in a range of 1290-1310 nm is effective for both metal objects and skin. The wavelengths that are selected can be specific to the application of the LIDAR system. For instance, since skin and metal are materials that are likely to be present in the path of a vehicle, the wavelength ranges of 1290-1310 nm and 1540-1560 nm are suitable for use with self-driving cars.

LIDAR output signals that carry a channel at a wavelength in a range of 1540-1560 nm have other advantages over LIDAR output signals that carry a channel at a wavelength in a range of 1290-1310. For instance, the amplifiers for light in the wavelength in a range of 1540-1560 nm are more readily available than amplifiers for light in the wavelength in a range of 1290-1310 nm. As a result, LIDAR output signals carrying wavelength in the range of 1540-1560 nm can have a higher intensity than LIDAR output signals carrying wavelength in the range of 1290-1310 nm. Additionally, wavelength in a range of 1540-1560 nm can have an atmospheric transmittance that is higher than wavelength in a range of 1290-1310 nm. The increased power levels and atmospheric transmission can compensate for lower reflectivity of certain materials.

Additionally, wavelengths in the range of 1290-1310 nm are also effective for use in generating LIDAR data for wet and dry textiles including polyester, wet woods such as oak, snow, coniferous trees, deciduous trees, and grass. Further, wavelengths in a range of 1540-1560 nm and 1290-1310 nm are both effective for generating LIDAR data for dry woods such as oak, wet and dry concrete, asphalt, soil, plastics such as PVC, and clouds. As a result, when the LIDAR system generates LIDAR output signals such that at least one LIDAR output signal has a wavelength in a range of 1540-1560 nm and at least one LIDAR output signal has a wavelength in a range of 1290-1310 nm, the LIDAR system is effective for a broad range of materials and is accordingly suitable for a broad range of applications.

In some instances, a method of generating and/or operating a LIDAR system includes identifying materials that might be included in one or more object that might reflect LIDAR output signals from the LIDAR system back to the LIDAR system. The method also includes configuring at least a portion of the LIDAR output signals to each have a wavelength that has a higher reflectance for one of the identified materials than any of the other LIDAR output signals. In some instances, the number of LIDAR output signals included in the portion of the LIDAR output signals is equal to the total number of LIDAR output signals output from the LIDAR system.

Other examples of wavelength ranges that are effective for particular materials include, but are not limited to, wavelengths in a range of 850-905 nm which are effective for trees; and wavelengths in a range of 2000-2500 nm which are effective for penetration of the atmosphere during poor visibility conditions, including rain and fog. Accordingly, the LIDAR system can generate at least one, two, three, or four LIDAR output signals that each carries a wavelength within a different one of the ranges included in the group consisting of 1290-1310 nm, 1540-1560 nm, 850-905 nm, and 1290-1310 nm.

Since the wavelength selection is directed to selecting wavelengths that are effective for particular materials, the wavelengths of the different channels are generally irregularly spaced on the wavelength spectrum rather than being periodically spaced on the wavelength spectrum. Additionally or alternately, the channels can be considered in pairs where the channels in each pair are located adjacent to one another on the wavelength spectrum and no other channel has a wavelength between the two channels included in the pair. In this arrangement, a single channel can be included in more than one pair of channels that are adjacent to one another on the wavelength spectrum. The material-based wavelength selection can increase the spacing between the channels in a channel pair. For instance, the LIDAR system can generate the LIDAR output signals such that at least one, two, or three channel pairs have wavelengths separated by more than 10 nm, 20 nm or 30 nm.

In some embodiments, the LIDAR system may be configured to direct multiple LIDAR output signals (e.g., two or more LIDAR output signals) that respectively correspond to the different wavelength ranges to scan the same sample region. The LIDAR system may then receive multiple reflected LIDAR input signals respectively corresponding to the different wavelength ranges that may be combined with the locally generated reference signals to generate multiple LIDAR data signals as described earlier with respect to FIGS. 1A-3C.

In some instances, the system may concurrently scan the same sample region with the multiple LIDAR output signals. The LIDAR system may be configured to combine the multiple LIDAR data signals and generate combined data associated with the distances and/or velocities of objects within the scanned sample region. In these instances, the system software can process the combined LIDAR data results in order to maximize the amount of information gained on the sample region. The combined data may depend on the reflectivities of the objects for each of the different wavelength ranges incident onto the objects. In some instances, objects comprising different materials may result in different signal-to-noise ratios associated with LIDAR input signals that correspond to the different LIDAR output signals.

For example, a LIDAR scan of a sample region that includes a user and a car may receive higher LIDAR return signal power levels for LIDAR wavelengths within a range of 1250 nm-1300 nm when directed onto the sample region associated with the user's skin relative to other LIDAR wavelengths (e.g., 1540 nm-1560 nm) while the opposite may be true for the sample region associated with the car that largely comprises a metal body. As such, the LIDAR wavelengths between approximately 1540 nm and 1560 nm may be more strongly reflected by the metal body of the car relative to the LIDAR wavelengths between 1250 nm and 1300 nm. The LIDAR system may then receive higher LIDAR return signal power levels associated with the wavelengths between approximately 1540 nm and 1560 nm when the system scans the car resulting in higher signal power levels for the resulting LIDAR data.

The higher LIDAR return signal power levels may result in improved system performance (e.g., increase in accuracy, precision, scan rate, and/or range) due to higher signal-to-noise ratios. Accordingly, the combined LIDAR data generated based on a combination of the LIDAR data generated by the different wavelengths may accurately detect various objects comprised of different materials simultaneously. In some embodiments, this may enable the LIDAR system to increase scan speeds by reducing chirp durations. In some other instances, the improved signal-to-noise ratios in the LIDAR input signal can allow the LIDAR system to operate at lower laser power levels and avoid the need to operate at higher laser power levels for materials that would otherwise be difficult to detect. This may increase the probability of detection across a range of different materials and/or reduce the probability of false positive.

As noted above, the LIDAR system can generate more than one LIDAR data result for a sample region when the LIDAR system directs more than one LIDAR output signal to the sample region. In these instances, the electronics can process the combined LIDAR data results in order to maximize the amount of information gained on the sample region. In one example, the LIDAR data results may be unmeasurable for all channels except for a single channel due to the reflectance properties of the sample region being very low for all channels except the single channel. In that case, the LIDAR data from the channel with measurable reflectance is treated as the final LIDAR data for the sample region.

In another example, the measured reflectances for each channel may vary in a pattern that is indicative of the materials in the sample region. For instance, one or more ratio(s) of the intensity of different LIDAR input signals relative to one another may indicate which material is in the sample region. The LIDAR data generated from the LIDAR output signal that is preferred for the identified material can be treated as the final LIDAR data for the sample region. In another example, the sample region may consist of an object of interest surrounded by background material, e.g. a polar bear on snow viewed from above. In this case it can be advantageous to compare the reflectances of sample regions that include the polar bear and the snow surrounding the bear using channels with a significant difference in reflectance between the bear and surroundings, and thus increase the contrast between the bear and its surroundings. For example, at 1500 nm the reflectance of the bear fur is over the range 20-60% and the reflectance of snow is <5%, thus providing enhanced contrast that can assist in object recognition.

Additionally or alternately, other methods of combining multiple different LIDAR data results can also be employed. For instance, multiple different LIDAR data results for a sample region can be averaged to find the final LIDAR data result, the median can be used as the final LIDAR data result. Additionally, a weighted average of the LIDAR data results can be used as the final LIDAR data result. In one example, the weight average is weighted by the intensity of the different LIDAR input signals.

Above, the complex data signals are described as having an in-phase component and a quadrature component that include out-of-phase portions of the reference signal; however, the unambiguous LIDAR data solution can be achieved by generating other complex data signals. For instance, the unambiguous LIDAR data solution can be achieved using a complex data signal where the in-phase component and the quadrature component include out-of-phase portions of the comparative signal. For instance, the first comparative waveguide 104 and the second comparative waveguide 106 can be constructed so as to provide a 90 degree phase shift between the first portion of the comparative signal and the second portion of the comparative signal with the first reference waveguide 110 and the second reference waveguide are constructed such that the first portion of the reference signal and the second portion of the reference signal are in-phase in the composite signals. Accordingly, the portion of the comparative signal in the first composite signal is phase shifted relative to the portion of the comparative signal in the second composite signal, however, the portion of the reference signal in the first composite signal is not phase shifted relative to the portion of the reference signal in the second composite signal.

Suitable output components 26 for use in the LIDAR systems of FIG. 1A through FIG. 3C can be waveguide facets. For instance, FIG. 4A is a topview of a portion of a LIDAR chip that includes the LIDAR signal waveguide 24 terminating at a facet 300 through which the LIDAR output signals exit the LIDAR chip and/or the LIDAR input signals enter the LIDAR chip.

In some instances, it is desirable to scan the LIDAR output signals to multiple different sample regions in the field of view so LIDAR data can be generated for the different sample regions. When the LIDAR signal waveguide 24 terminates at a facet 300, various scanning mechanisms can be used to scan the LIDAR output signals. For instance, the LIDAR output signals can be received by one or more reflecting devices and/or one more collimating devices. The one or more reflecting devices can be configured to re-direct and/or steer the LIDAR output signal so as to provide scanning of the LIDAR output signal. Suitable reflecting devices include, but are not limited to, mirrors such mechanically driven mirrors and Micro Electro Mechanical System (MEMS) mirrors. The one or more collimating devices provide collimation of the LIDAR output signal and can accordingly increase the portion of the LIDAR input signal that enters the LIDAR signal waveguide 24. Suitable collimating devices include, but are not limited to, individual lenses and compound lenses.

Figure 4A:
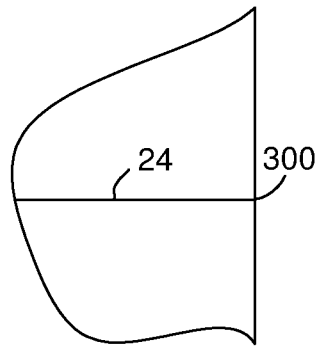
FIG. 4A illustrates a waveguide facet serving as an output component.
Figure 4B:
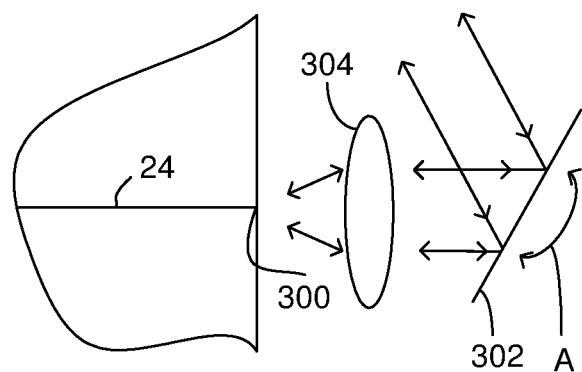
FIG. 4B illustrates the LIDAR chip of FIG. 4A used with an off-chip scanning mechanism.

FIG. 4B illustrates the portion of the LIDAR chip shown in FIG. 4A used with a reflecting device 302 and a collimating device 304. For instance, a lens serves as a collimating device 304 that receives the LIDAR output signals and provides collimation of the LIDAR output signals. A mirror serves as a reflecting device 302 that receives the collimated LIDAR output signals and reflects the collimated LIDAR output signals in the desired direction. As is illustrated by the arrow labeled A, the electronics can move the mirror so as to steer the collimated LIDAR output signals and/or scan the collimated LIDAR output signals. The movement of the mirror can be in two dimensions or three dimensions. Suitable mirrors include, but are not limited to, mechanically driven mirrors and Micro Electro Mechanical System (MEMS) mirrors.

Figure 4C:
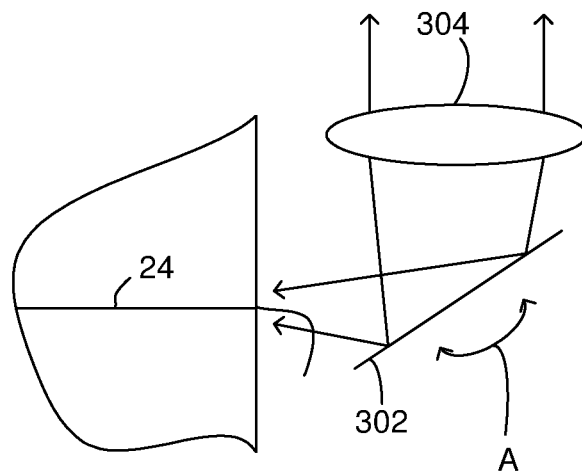
FIG. 4C illustrates the LIDAR chip of FIG. 4A used with another embodiment of an off-chip scanning mechanism.

FIG. 4C illustrates the portion of the LIDAR chip shown in FIG. 4A used with a reflecting device 302 and a collimating device 304. For instance, a mirror serves as a reflecting device 302 that receives the LIDAR output signals and reflects the LIDAR output signals in the desired direction. As is illustrated by the arrow labeled A, the electronics can move the mirror so as to steer the LIDAR output signals and/or scan the LIDAR output signals. A lens serves as a collimating device 304 that receives the LIDAR output signals from the mirror and provides collimation of the LIDAR output signals. The lens can be configured to move with the movement of the mirror so the lens continues to receive the LIDAR output signals at different positions of the mirror. Alternately, the movement of the mirror can be sufficiently limited that the lens continues to receive the LIDAR output signals at different positions of the mirror. The movement of the mirror can be in two dimensions or three dimensions. Suitable mirrors include, but are not limited to, mechanically driven mirrors and Micro Electro Mechanical System (MEMS) mirrors.

Figure 5:
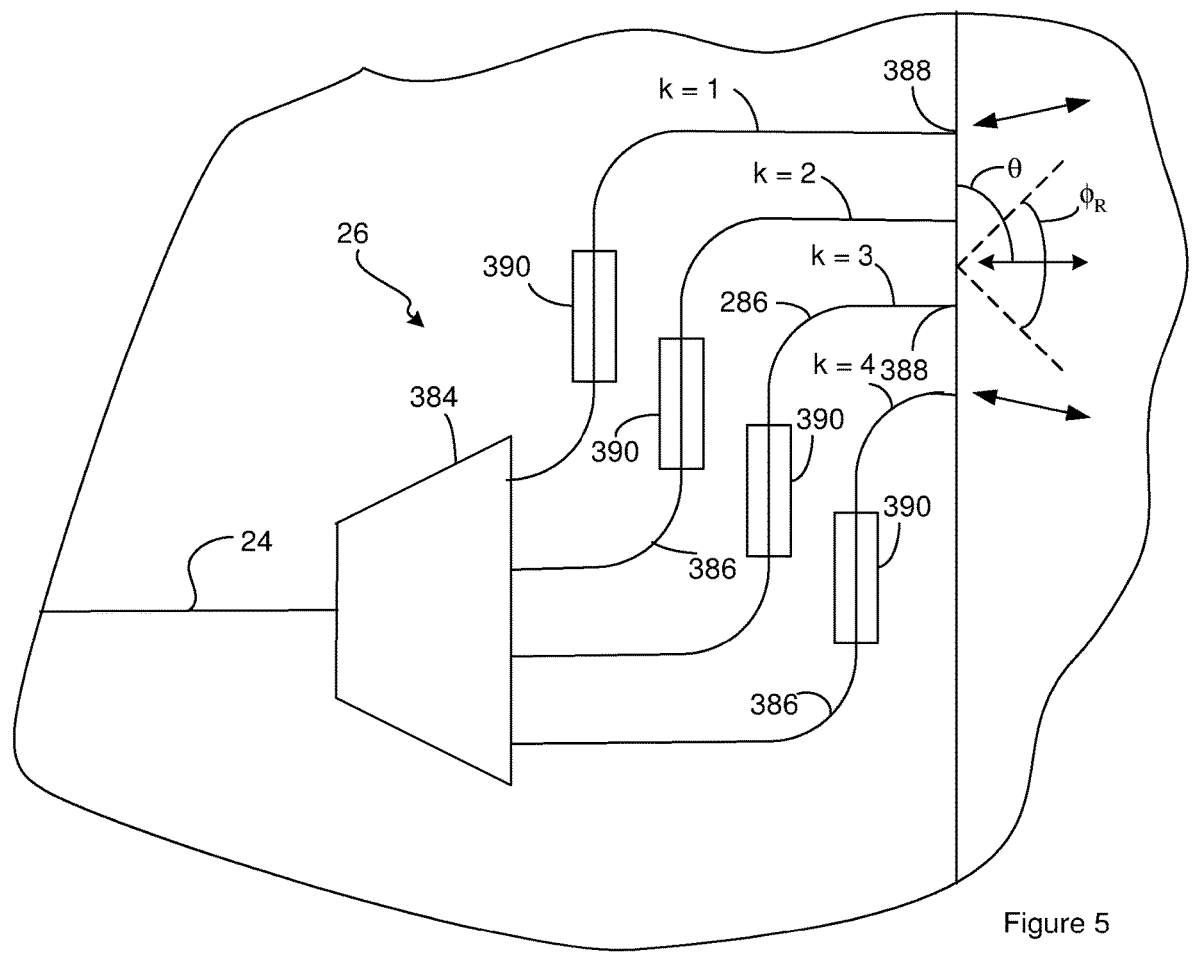
FIG. 5 illustrates an example of an output component that optionally includes beam steering capability.

FIG. 5 illustrates an example of a suitable output component 26 that can optionally include beam steering capability. The output component 26 includes a splitter 384 that receives the outgoing light signal from the LIDAR signal waveguide 24. The splitter 384 divides the outgoing light signal into multiple output signals that are each carried on a steering waveguide 386. Each of the steering waveguides ends at a facet 388. The facets are arranged such that the output signals exiting the LIDAR chip through the 388 facets combine to form the LIDAR output signals.

The splitter 384 and steering waveguides 386 can be constructed such that there is not a phase differential between output signals at the facet of adjacent steering waveguides. For instance, the splitter can be constructed such that each of the output signals is in-phase upon exiting from the splitter and the steering waveguides can each have the same length. The lack of a phase differential between the output signals causes each of the channels in the outgoing LIDAR signal to travel away from the output component 26 in the same direction (θ). Suitable numbers of steering waveguides 386 (M) include, but are not limited to, M greater than 10, or 500 and/or less than 1000, or 2000. Suitable splitters include, but are not limited to, star couplers, cascaded Y-junctions and cascaded 1λ2 MIMI couplers.

In some instances, a phase tuner 390 is optionally positioned along at least a portion of the steering waveguides. Although a phase tuner is shown positioned along the first steering waveguide and the last steering waveguide, one or both of these phase tuners are optional. For instance, the output component 26 need not include a phase tuner on steering waveguide k=1.

The electronics can be configured to operate the phase tuners 390 so as to create a phase differential between the output signals at the facet of adjacent steering waveguides 386. The electronics can operate the phase tuners 390 such that the phase differential is constant in that it increases linearly across the steering waveguides. For instance, electronics can operate the phase tuners such that the tuner-induced phase of steering waveguide number k is (k−1) β where k is an integer from 1 to M and represents the number associated with a steering waveguide when the steering waveguides are sequentially numbered as shown in FIG. 5, β is the tuner-induced phase differential between neighboring steering waveguides. Accordingly, the phase of steering waveguide number k is $f_o+(k-1)f+(k-1)\beta$. FIG. 5 illustrates the chip having only 4 steering waveguides in order to simplify the illustration, however, the chip can include more steering waveguides. For instance, the chip can include more than 4 steering waveguides, more than 100 steering waveguides, or more than 1000 steering waveguides and/or less than 10000 steering waveguides.

The electronics can be configured to operate the phase tuners 390 so as to tune the value of the phase differential β. Tuning the value of the phase differential β changes the direction that the LIDAR output signals travel away from the chip (θ). Accordingly, the electronics can scan the LIDAR output signals by changing the phase differential α. The range of angles over which the LIDAR output signal can be scanned is $\phi_R$ and, in some instances, extends from $\phi_v$ to $-\phi_v$ with φ=0° being measured in the direction of the LIDAR output signal when β=0.

In addition to creating the phase differential or as an alternative to creating the phase differential, the phase tuners 390 can be operated so as to collimate or focus the LIDAR output signals. For instance, the phase tuners 390 can be operated such that there is a constant phase differential β induced between the successive waveguides so that the induced phase for waveguide k is $\varphi_k=(k-1)\beta$, where β is a constant in the case a collimated beam. For a focused beam, as suitable nonlinear phase dependence can be induced.

Additional details about the construction and operation of an output component 26 constructed according to FIG. 5 can be found in U.S. Provisional Patent Application Ser. No. 62/680,787, filed on Jun. 5, 2018, and incorporated herein in its entirety.

There may be some spreading of the different LIDAR output signals in the outgoing LIDAR signal as they travel away from the output component 26. Because the LIDAR output signals are directed to the same sample region, the degree of separation can be such that the spot size of each of the LIDAR output signals is overlapped by at least one of the other LIDAR output signals by more than an overlap threshold percentage at the maximum distance for which the LIDAR system is configured to provide LIDAR data. Suitable overlap threshold percentages include more than 5% of the spot size, more than 25% of the spot size or more than 50% of the spot size. As noted above, the maximum distance is commonly set by the specifications of the application to which the LIDAR system is being applied. An example of circumstances where there may be some spreading of the different LIDAR output signals in the outgoing LIDAR signal as they travel away from the output component 26 is when the path length difference between steering waveguides 386 is non-zero.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A LIDAR system, comprising:
a LIDAR system configured to output multiple LIDAR output signals that are each concurrently directed to a sample region in a field of view, the sample region being one of multiple sample regions included in the field of view,
the LIDAR output signals each carrying a channel at a different wavelength,
the wavelengths of the different channels being non-periodically spaced on the wavelength spectrum; and
the LIDAR system configured to concurrently receive multiple LIDAR input signals that have each been reflected by an object located outside of the LIDAR system and within the sample region, the LIDAR input signals each including light from a different one of the LIDAR output signals.

2. The system of claim 1, wherein at least one pair of channels that are adjacent to one another on the wavelength spectrum have wavelengths separated by more than 10 nm.

3. The system of claim 2, wherein at least two pair of channels that are adjacent to one another on the wavelength spectrum have wavelengths separated by more than 30 nm.

4. The system of claim 1, wherein the LIDAR system outputs at least three LIDAR output signals that are each concurrently directed to a sample region in a field of view and that each carries a channel at a different wavelength.

5. The system of claim 1, wherein at least one of the LIDAR output signals includes light from a laser source with a gain medium that includes quantum dots.

6. The system of claim 5, wherein the at least one of the LIDAR output signals carries a channel with a wavelength in a range of 1290 nm to 1310 nm.

7. The system of claim 1, further comprising:
electronics that perform a mathematical transform on electrical signals that are a function of a radial velocity and/or distance between the LIDAR system and the object;
the transform outputs only one frequency solution that is associated with the object in the sample region where each frequency solution associated with an object would not be output from the mathematical transform if the object were removed from the sample region.

8. The system of claim 7, wherein the mathematical transform is one of multiple mathematical transforms that the electronics are configured to perform, each of the transforms being performed on electrical signals that that are a function of the radial separation and/or distance between the LIDAR system and different transforms are performed on electrical signals carrying different channels.

9. The system of claim 7, wherein the LIDAR system includes a LIDAR chip configured to output the LIDAR output signals; and
the LIDAR chip includes a light-combining component configured to combine light from a comparative light signal and light from a reference signal so as generate a composite signal,
the comparative signal including light from the LIDAR output signal, and the reference signal not including light from the LIDAR output signal.

10. The system of claim 9, wherein the LIDAR chip includes a waveguide configured to guide an outgoing LIDAR signal, each of the LIDAR output signals includes light from the outgoing LIDAR signal and the reference signal includes light from the outgoing LIDAR signal.

11. The system of claim 9, wherein each of the LIDAR input signals is a function of a radial velocity and/or a distance between the object and the LIDAR chip.

12. The system of claim 11, wherein the reference signal is not a function of the radial velocity and/or a distance between the object and the LIDAR chip.

13. The system of claim 9, wherein the reference signal does not exit from the LIDAR chip before being included in the composite signal.

14. The system of claim 9, wherein the composite signal includes the comparative signal beating against the reference signal.

15. The system of claim 9, wherein the LIDAR chip includes one or more waveguides configured to guide light through silicon.

* * * * *